United States Patent [19]

Meindl et al.

[11] 3,876,107

[45] Apr. 8, 1975

[54] PROCESS AND APPARATUS FOR CONVEYING LIQUIDS CONTAINING GASES

[75] Inventors: Johannes Karl Meindl; Gerhard Leopold Artmüller, both of Maria Enzersdorf/Sudstadt, Austria

[73] Assignee: Wienerberg Getranke Gesellschaft m.b.H., Vienna, Austria

[22] Filed: Apr. 26, 1972

[21] Appl. No.: 247,531

[30] Foreign Application Priority Data
Apr. 30, 1971 Austria .......................... 3744/71

[52] U.S. Cl.................. 222/64; 222/129; 137/209; 261/DIG. 7
[51] Int. Cl............................................. B67d 5/08
[58] Field of Search ............ 222/61, 64, 399, 400.5, 222/400.8, 129.1, 1, 129; 261/34 R, DIG. 7; 137/209

[56] References Cited
UNITED STATES PATENTS

| 494,483 | 3/1893 | Malmstrom .................. 261/DIG. 7 |
|---|---|---|
| 1,989,395 | 6/1935 | Betz et al. ........................... 222/399 |
| 2,379,215 | 6/1945 | Brinkmann ............................ 221/1 |
| 2,960,272 | 11/1960 | Saunders ........................... 137/209 |
| 3,221,931 | 12/1965 | Porter ................................. 221/1 |
| 3,481,350 | 12/1969 | Chamberlain ..................... 137/209 |
| 3,604,594 | 9/1971 | Isreeli ............................... 222/64 |

*Primary Examiner*—Robert B. Reeves
*Assistant Examiner*—H. Grant Skaggs, Jr.
*Attorney, Agent, or Firm*—Cushman, Darby & Cushman

[57] ABSTRACT

Apparatus for the transfer of a gas-containing liquid of the kind including a storage container for storing the liquid under gas pressure, a supply conduit leading from the storage container to a pressure-tight intermediate container disposed at a higher level than the storage container, a tap station connected to the intermediate container, and a source of pressurized gas connected to the storage container, the improvement comprising a pump arranged at the storage container, the pump having an input end and an output end, the input end being connected to the storage container so as to be supplied with liquid under the pressure existing in the storage container and the output end being connected to the supply conduit, liquid level control means responsive to the liquid level in the intermediate container for controlling the amount of liquid fed by the pump, the supply conduit opening into the intermediate container below the lowest liquid level in the intermediate container permitted by the liquid level control means, and a source of pressurized gas maintaining the pressure in the intermediate container at a higher pressure than is present in the storage container.

5 Claims, 1 Drawing Figure

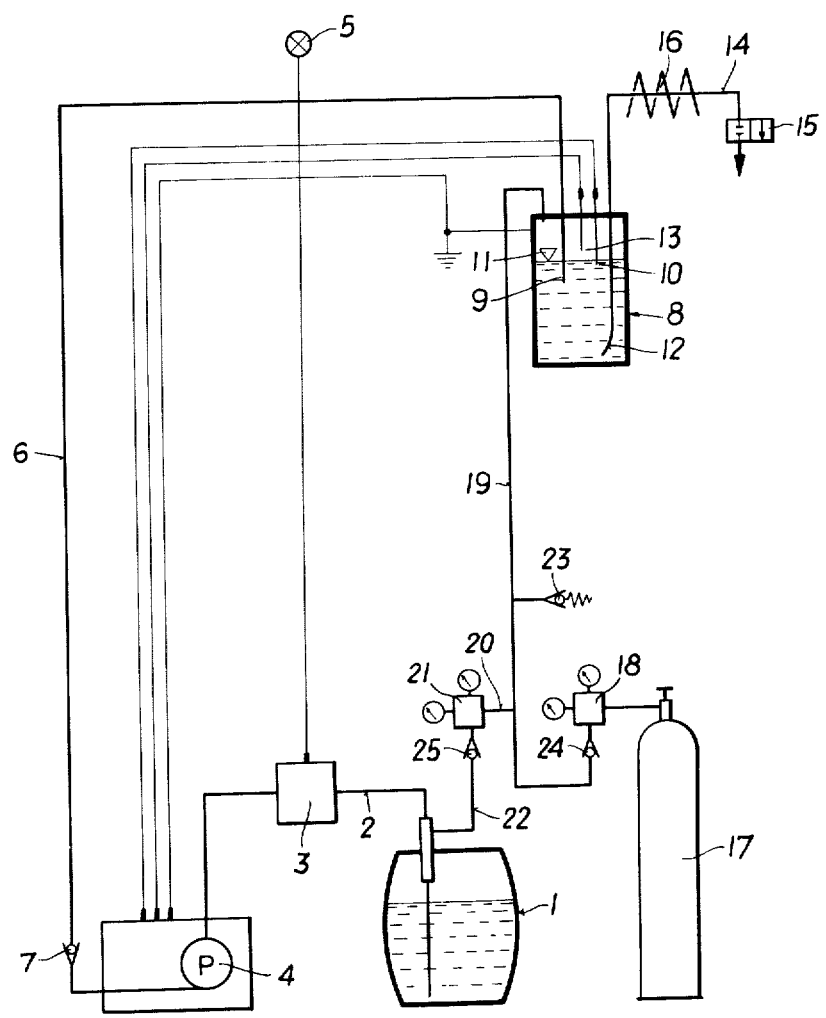

PROCESS AND APPARATUS FOR CONVEYING LIQUIDS CONTAINING GASES

The present invention refers to a process and apparatus for conveying gas-containing liquids, particularly beverages containing carbon dioxide, from a storage container, via a pressure-tight intermediate container, to at least one tap station, the intermediate container and the tap station conveniently being arranged at a higher level than the storage container.

It is known to convey liquids of the type described from the storage container, for example a barrel, by means of gas-pressure exerted above the liquid level within the storage container. The gas-pressure to be established within the storage container is, however, limited by the mechanical strength of the storage container, so that the liquid to be conveyed can only be fed for a certain height by means of the gas-pressure preveiling within the storage container, for example a barrel. Further, when conveying beverages the applicable gas-pressure has an upper limit because excessive gas-pressure would result in a so-called post-impregnation of the beverage by the gas and, respectively, carbon dioxide, with accompanying impairing the quality or taste of the beverage. Additionally, when conveying the liquid by means of the gas-pressure prevailing within the storage container for a bigger height difference, the pressure reduction occurring in higher levels gives rise to foam formation within the beverage. The foam produced substantially prevents the liquid from being unobjectionably fed to the tap station what makes tapping at the tap station quite difficult.

It is an object of the invention to avoid the mentioned difficulties. For this purpose a process for conveying gas-containing liquids, particularly beverages containing carbon dioxide, from a storage container, via a pressure-tight intermediate container, to at least one tap station comprises the improvement which essentially consists in that the liquid, being subjected within the storage container to gas-pressure, is, at the exterior of the storage container subjected to a positive pressure exceeding the gas-pressure within the storage container, and in that the liquid present within the intermediate container is subjected to a gas-pressure exceeding the gas-pressure within the storage container.

By subjecting the liquid to be conveyed to a higher positive pressure only at the exterior of the storage container it is made possible to use storage containers of lower mechanical strength. The higher positive pressure can be exerted by means of a pump. the storage container, in most cases, is a barrel, which might possibly have been damaged during transport such that its mechanical strength has been weakened. For beverages containing carbon dioxide the pressurized gas used is carbon dioxide itself what, when maintaining a high gas pressure within the storage container, within which the liquid is stored for a longer time period, might cause an objectionable post impregnation. By supplying the liquid contained within the storage container to the pump under the influence of gas-pressure maintained within the storage container, a pressure relief of the liquid during its path of travel to the pump and, therewith, also foam formation can be avoided. Within the pump itself the liquid is subjected to the mentioned increased positive pressure so that the danger of foam formation is further reduced. The increased positive pressure to which the liquid is subjected is determined by the counterpressure within the intermediate container which counterpressure in its turn is determined by a gas-cushion within the intermediate container and above the level of the liquid contained therein. Therewith, a pressure reduction is also avoided within the path of travel of the liquid unto the intermediate container. Further, when positioning the intermediate container approximately at the level of the tap stations, also downstream of said intermediate container, i.e., in the path of travel of the liquid from the intermediate container to the tap stations, a pressure reduction, which could give rise to foam formation cannot be expected. Thus, a process according to the invention provides the possibility to tap gas-containing liquids with substantial no foam formation what substantially facilitates tapping of predetermined portions of beverages containing carbon dioxide. Under the existing conditions the increased positive pressure is limited to the path of travel from the pump to the tap station so that the time interval, within which the liquid and, respectively, the beverage containing carbon dioxide is subjected to increased gas pressure, is essentially shorter than the storage time of the liquid within the storage container. Thus, the danger of a post-impregnation of the beverage with carbon dioxide is essentially avoided. When applying the process according to the invention the liquid can be conveyed over long distances and fed to substantial higher levels without the necessity of increasing the gas pressure within the storage container.

For increasing the solubility of the gas, f.i. carbon dioxide, in the liquid to be conveyed and for counteracting any foam formation at the tap station it is expedient to cool the liquid and, respectively, the beverage during its path of travel from the intermediate container to the tap station.

An apparatus for carrrying out a process according to the invention, being provided with a storage container and a supply conduit leading from the storage container to a pressure-tight intermediate container arranged at a higher level and being further provided with at least one tap station connected to said intermediate container and a source of pressurized gaseous fluid for the storage container, comprises the improvement consisting of a pump arranged at the storage container and being supplied through its input end by the liquid contained in the storage container under the action of the low positive pressure prevailing therein and being connected with its output end to said supply conduit, the intermediate container being provided with a liquid level control means for controlling the amount of liquid fed by said pump, the supply conduit being connected to said intermediate container below the lowest possible liquid level within the intermediate container and a source of pressurized gaseous fluid is also provided for said intermediate container. By means of an apparatus according to the invention, gas-containing liquids can be fed to higher levels without using excessive high gas-pressure. The pump used for conveying the gas-containing liquid from the storage container to the intermediate container must operate without exerting a suction action to the incoming liquid, what means that the liquid must be supplied to the pump under slight positive pressure. The necessary slight positive pressure is already provided by the hydrostatic pressure existing when arranging the pump below the storage container. However, the pump may be arranged beside the storage container, provided the liquid is subjected to positive pressure within the storage container. A pump designed for exerting a suction action on the liquid cannot be used because such suction action would cause deliberation of gas previously dissolved within in liquid and, therewith, would cause excessive foam formation. As already mentioned, the intermediate container is provided with a liquid level control means which is adapted for deenergizing the pump motor when reaching a predetermined maximum level within the intermediate container and for again energizing the pump motor when reaching a predetermined minimum level within the intermediate container. This arrangement provides the possibility that also on tapping from the intermediate container a sufficient amount ot liquid is fed from the storage container into the intermediate container and that continuous tapping is possible at the tap stations. The intermediate container can be provided with a stand pipe inserted into the intermediate container and having its lower end arranged adjacent the bottom of the intermediate container and having its outer end connected to the tap conduit. In view of this arrangement it is possible to completely empty the intermediate container in case of a stand-still of an apparatus according to the invention. As already mentioned, the storage container as well as the intermediate container is provided with a source of pressurized gaseous fluid for, at the one hand, subjecting the liquid contained in the storage container to pressure and warranting forcible supply of said liquid to a pump arranged beside the storage container and for, at the other hand, maintaining constant gas-pressure within said containers in spite of varying liquid content and thus also varying gas volume within said containers. The source of pressurized gaseous fluid for the intermediate container is intended for maintaining within the intermediate container a predetermined positive pressure, and, therewith, for supplying liquid to the tap station. Further, when conveying gas-containing liquids from the storage container to the intermediate container a positive pressure corresponding to the gas-pressure of the liquid to be conveyed must exist within the intermediate container and the supply conduit to avoid deliberation of the gas dissolved in the liquid. This measure also avoids foaming of the liquid.

According to a favourable embodiment of an apparatus according to the invention a common source of pressurized gaseous fluid is provided, said common source of pressurized gaseous fluid being connected via a first pressure reducing valve and a pressure conduit to the intermediate container and the storage container being connected via a second pressure reducing valve to said pressure conduit. The pressure conduit is provided with a pressure relief valve. The first pressure reducing valve is adapted for adjusting within the intermediate container and within the pressure conduit a pressure corresponding to the pressure with which the gas has to be maintained in solution within the liquid. In view of the fact that the pressure to be maintained within the storage container need only have a value just sufficient for forcible supply of the liquid to the pump, a further pressure reducing valve is interconnected into a branch-conduit leading from the pressure conduit to the storage container. Now, when adjusting a predetermined counter-pressure within the intermediate container and the pressure conduit and when adjusting a predetermined pressure within the storage container and when further conveying liquid from the storage container to the intermediate container, a gas volume corresponding to the volume of the liquid fed into the intermediate container is expelled out of the intermediate container and can be introduced into the storgae container which, in view of the liquid extracted therefrom, can accommodate an increased gas volume. For avoiding excessive positive pressure within the supply conduit or within the intermediate container a pressure relief valve is connected to the pressure conduit, said pressure relief valve being adapted for venting excessive gas.

The connection of the pressure conduit for the pressurized gaseous fluid to the first pressure reducing valve and the connection of the pressure conduit leading from the storage container to the second pressure reducing valve preferably is designed such that the pressure conduit for the pressurized gaseous fluid is connected to the first pressure reducing valve via a check valve and that the storage container is connected to the second pressure reducing valve via a further check valve. This arrangement is made for the purpose of preventing that on occasional excessive pressure neither gas nor liquid can enter the pressure reducing valves and that in case of occasional excessive pressure any gas is vented via the pressure relief valve.

The invention is further illustrated with reference to the drawing in which an embodiment of an apparatus according to the invention is schematically illustrated.

A beverage containing carbon dioxide, such as beer, is fed via a supply conduit 2 and a control means 3 signalizing empty condition of the apparatus to a pump 4, which is designed for exerting no suction as is the case with a vane cell pump. The control means 3 is connected to optical or acoustical signalizing means 5 located at the tap stations. The motor of the pump 4 is equipped with a disconnecting switch controlled by the control means 3 so that on emptying the storage container 1 no gas is supplied by the pump 4 into the intermediate container 8.

The beer is fed by pump 4 via supply conduit 6, provided with an interconnected check valve 7, into the intermediate container 8. Check valve 7 is arranged near the pump 4. The supply conduit 6 is introduced with its filling tube 9 into the intermediate container 8, noting that the end of the filling tube 9 is located just below the lowest liquid level 11 within the intermediate container 8. Said lowest liquid level 11 is controlled by a liquid level control means 10. This arrangement provides the advantage that when feeding beer into the intermediate container the beer alreadly contained in the intermediate container is not disturbed. When extracting beer from the intermediate container 8 via the stand pipe 12, the end of which is located adjacent the bottom of the intermediate container 8, the liquid level 11 is lowered until the liquid level control means 10 controlling the lowest admissible liquid level will energize the pump 4 what in turn results in further supply of beer into the intermediate container 8. As soon as the liquid level 11 within the intermediate container reaches the upper admissible level a liquid control means 13 is deenergizing the pump 4.

Under this condition, beer can be tapped from the intermediate container 8 at the tap station 15 via stand pipe 12 and the tap conduit 14 to which a cooling coil 16 is coordinated.

Prior to starting supply of beer from the storage container 1 into the intermediate container 8 a positive pressure must be established within the storage container 1 so that the beer contained within said storage container is fed to pump 4 under the action of said positive pressure and further within the intermediate container 8 and the supply conduit 6 a higher positive pressure must be established to attain a counter-pressure acting on the beer so that deliberation of carbon dioxide from the beer and foaming of the beer during its path of travel into the intermediate container 8 is avoided. The source of pressurized gaseous fluid used in the embodiment shown is a thick-walled flask 17 containing carbon dioxide under pressure. Carbon dioxide is withdrawn from said flask 17 with a pressure of e.g. 2.2 at gauge via a first pressure reducing valve 18. Said pressure of 2.2 at gauge corresponds to the pressure of the carbon dioxide dissolved in the beer. The carbon dioxide is supplied via the pressure conduit 19 into the intermediate container 8 and into the branch conduit 20 connected to the pressure conduit 19 and leading to a second pressure reducing valve 21, which with its opposite end is connected to the storage container 1 via a further pressure conduit 22. By means of said second pressure reducing valve 21 the mentioned lower pressure, e.g. a pressure of 0.5 at gauge, is adjusted under the action of which the beer is flowing from the storage container 1 to the pump 4. A pressure relief valve 23 is connected to the storage pressure conduit 19 and adjusted to a pressure exceeding the required pressure within pressure conduit 19 for approximately 0.3 to 0.5 at gauge. If, under the conditions mentioned, beer is fed from the storage container 1 into the intermediate container 8 by means of pump 4, which must overcome the pressure prevailing within supply conduit 6 and intermediate container 8, a volume of carbon dioxide corresponding to the volume of beer supplied into the intermediate container 8 is expelled from said intermediate container via the pressure conduit 19 and the branch conduit 20 into the storage container 1 and is compensating the reduced volume of beer within the storage container. If, however, the pressure reducing valve 21 will be closed the carbon dioxide is vented via the pressure relief valve 23.

When substituting an empty $CO_2$-flask for a fresh one, a sudden pressure drop within the whole system of the apparatus shown can be avoided by check valves 24 and 25 provided at those ends of the pressure reducing valves 18 and 21 leading to the intermediate container 8 and, respectively, the storage container 1. Said check valves 24 and 25 also prevent beer from entering the pressure reducing valves.

The check valve 7 interconnected into supply conduit 6 is intended to avoid back-flow of beer from the intermediate container 8 via filling tube 9 into the storage container 1 in case of malfunction of pressure relief valve 23.

We claim:

1. Apparatus for the transfer of a gas-containing liquid of the kind including a storage container for storing the liquid under gas pressure, a supply conduit leading from the storage container to a pressure-tight intermediate container disposed at a higher level than the storage container, a tap station connected to the intermediate container, and a source of pressurized gas connected to the storage container, the improvement comprising a pump arranged at the storage container for pumping liquid to said intermediate container against the pressure existing therein, the pump having an input end and an output end, the input end being connected to the storage container so as to be supplied with liquid under the pressure existing in the storage container and the output end being connected to the supply conduit, liquid level control means responsive to the liquid level in the intermediate container for controlling the amount of liquid fed by the pump, the supply conduit opening into the intermediate container below the lowest liquid level in the intermediate container permitted by the liquid level control means, a source of pressurized gas connected to the intermediate container via a pressure conduit and a first pressure reducing valve for maintaining the pressure in the intermediate container at a higher pressure than is present in the storage container, a pressure relief valve associated with the pressure conduit, and a second pressure reducing valve connecting the pressure conduit to the storage container.

2. Apparatus as in claim 1 wherein the pressure conduit for the gaseous pressurized fluid is connected to said first pressure reducing valve via a check valve and wherein the storage container is connected to said second pressure reducing valve via a further check valve.

3. Apparatus as in claim 1 including a tap conduit leading from the intermediate container to the tap station and further including means for cooling the tap conduit.

4. Apparatus as in claim 1 wherein the supply conduit is terminated by a filling tube ending a short distance below the lowest liquid level within the intermediate container.

5. Apparatus as in claim 1 including a check valve in the supply conduit for preventing liquid flow into the storage container.

* * * * *